US008160537B2

(12) United States Patent
Ozer et al.

(10) Patent No.: US 8,160,537 B2
(45) Date of Patent: Apr. 17, 2012

(54) METHOD AND APPARATUS FOR AGGREGATING INFORMATION IN A WIRELESS COMMUNICATION SYSTEM

(75) Inventors: Sebnem Zorlu Ozer, North Wales, PA (US); Charles R. Barker, Orlando, FL (US); Guenael J. Strutt, Sanford, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 873 days.

(21) Appl. No.: 12/183,697

(22) Filed: Jul. 31, 2008

(65) Prior Publication Data
US 2010/0029243 A1 Feb. 4, 2010

(51) Int. Cl.
*H04M 11/04* (2006.01)
(52) U.S. Cl. .................. 455/404.1; 455/452.2; 455/521; 370/338; 370/406; 370/408; 370/465; 370/468
(58) Field of Classification Search .................. 455/11.1, 455/90.1, 404.1, 404.2, 445, 450, 452.1, 455/452.2, 453, 509, 512, 513, 517, 518, 455/521, 524, 526; 370/310, 312, 315, 328, 370/329, 338, 351, 352, 392, 400, 401, 406, 370/408, 464, 465, 468, 901, 908; 379/37–51
See application file for complete search history.

(56) References Cited

U.S. PATENT DOCUMENTS

| 6,208,975 | B1 | 3/2001 | Bull et al. |
| 6,275,481 | B1 | 8/2001 | Penttinen |
| 6,735,630 | B1 | 5/2004 | Gelvin et al. |
| 6,832,251 | B1 | 12/2004 | Gelvin et al. |
| 6,985,740 | B2 | 1/2006 | Shyy et al. |
| 7,042,985 | B1 | 5/2006 | Wright |
| 7,839,856 | B2 * | 11/2010 | Sinha et al. .................... 370/392 |
| 7,848,278 | B2 * | 12/2010 | Chen et al. ..................... 370/328 |
| 2004/0111639 | A1 | 6/2004 | Schwartz et al. |
| 2004/0176066 | A1 | 9/2004 | Binzel et al. |
| 2006/0079200 | A1 * | 4/2006 | Hirouchi et al. ........... 455/404.1 |
| 2006/0120517 | A1 | 6/2006 | Moon et al. |
| 2007/0254670 | A1 * | 11/2007 | Kawaguchi et al. .......... 455/445 |
| 2009/0005052 | A1 * | 1/2009 | Abusch-Magder et al. .. 455/446 |
| 2009/0143046 | A1 * | 6/2009 | Smith ......................... 455/404.1 |

OTHER PUBLICATIONS

Joe Kwak et al., "VOIP in 802.11 WLANs and E911 support," IEEE 802.11.05/0014r1, Jul. 2005, slides 4 & 8.
Magnus Olson, "Liaison from 3GPP SA2 for IEEE 802.11." IEEE 802.11-05/0922r0, Sep. 2005, 3 pages.
Farooq Bari, "Liaison to 3GPP SA2 from IEEE 802.11," IEEE 802.11-05/0988r22, Sep. 2005, 3 pages.

(Continued)

*Primary Examiner* — Anthony Addy
(74) *Attorney, Agent, or Firm* — Randi L. Karpinia (57) ABSTRACT

A Wireless Router (WR) aggregates information regarding the emergency calls based on their context and routes the aggregated emergency information to the correct portal which directs the aggregated emergency to appropriate Public Safety Answering Point (PSAP). The information aggregation is automatically triggered when the number of calls exceeds the multihop capacity to the egress point. The PSAP responds to the emergency situation by sending a response message via the Portal. The WR multicast/broadcasts the response message to the mobile devices which initiated the emergency calls. The response message generally includes emergency instructions based on incident type and location. Further, a call-back list is created for users whose emergency calls were not completed. By using the call-back list PSAP personnel can initiate calls to end users to provide assistance in emergency situations.

19 Claims, 6 Drawing Sheets

OTHER PUBLICATIONS

Mike Moreton, "Emergency Call Support," IEEE 802.11-05/1096r2, Jan. 2006, slides 3,7,9, and 10.

Alistair Buttar, "E911 Specifics," IEEE 802.11-05/1119r0, Nov. 2005, slides 6 and 9.

Michael Montemurro et al., "Emergency Services Signaling for WLAN," IEEE 802.11-06/0003r0, Jan. 2006, slides 4-7.

Hepworth et al., "Tgu Proposal for E911 support," IEEE 802.11-06/280r0, Mar. 2006, pp. 3-9.

Stefano M. Faccin et al., "Proposal for supporting Emergency Services," IEEE 802.11-06/0288r1, Mar. 2006, pp. 3-7.

Vivek Gupta et al., "Proposal for supporting Emergency Services," IEEE 802.11-06/0290r0, Mar. 2006, pp. 3-6.

H. Schulzrinne et al., "Requirements for Emergency Context Resolution with Internet Technologies draft," ECRIT Requirements-Internet Draft, Dec. 30, 2005, pp. 2 and 12.

James Polk et al., "Emergency Context Routing of Internet Technologies Architecture Considerations Draft," ECRIT Requirements-Internet Draft, Oct. 24, 2005, pp. 1 and 3.

* cited by examiner

METHOD AND APPARATUS FOR AGGREGATING INFORMATION IN A WIRELESS COMMUNICATION SYSTEM

FIELD OF THE DISCLOSURE

The present disclosure relates generally to wireless communications and more particularly to a method and apparatus for aggregating information in a wireless communication system.

BACKGROUND

When a sudden and widespread crisis, such as a natural disaster or a terrorists attack occurs, communication channels may become saturated beyond their maximum capacity. Further, the percentage of emergency calls made using wireless devices is increasing at a rapid rate. For example, it is estimated that approximately thirty percent of emergency calls that were made in 2000 were done so by wireless communication device users. This is a ten-fold increase from just ten years earlier. It is anticipated that this increasing rate of wireless emergency calls will continue in the future.

Wireless callers may use a wide range of wireless communication systems to initiate an emergency call. In general, wireless communication systems include communication mechanisms necessary to ensure the completion of an emergency call reliably.

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media with or without the support of an infrastructure-based wired network.

A wireless mesh network is a collection of wireless nodes or devices organized in a decentralized manner to provide range extension by allowing nodes to be reached across multiple hops. In a multi-hop network, communication packets sent by a source node can be relayed through one or more intermediary nodes before reaching a destination node. A large network can be realized using intelligent access points (IAP) which provide wireless nodes with access to a wired backhaul. A mesh network therefore typically comprises one or more IAPs (Intelligent Access Points), and a number of APs (Access Points), which provide data service to STAs (subscriber stations). An AP can connect to IAP directly or through multi-hop route. Requirements for supporting an emergency call impose additional challenges for Ad-hoc networks. For example, there are additional operation challenges associated with routing a high number of emergency calls from mobile stations to a geographically appropriate public safety authority (i.e. Public Safety Answering Point (PSAP)).

Generally, Ad-hoc networks and mesh networks have limited bandwidth between any two nodes. Therefore, in emergency situations when a large number of emergency calls originate from a particular location, there are bottlenecks between nodes in the mesh network. Furthermore, in emergency situations which affect large areas (e.g. natural disasters, terrorist attacks in public areas) some infrastructure nodes of the mesh network may be destroyed, reducing the bandwidth even more. In this case, even when the number of voice call initiators is relatively small, the network may not support such calls that require low delay and jitter.

Although current systems can preempt low priority calls, the congestion problem in the mesh network will not be resolved because the priority of all the emergency calls may be the same. Since conventional call admission and congestion control schemes may not resolve this problem, delays and even disruption of services may occur due to timeouts in route and call establishment processes. This will prevent the PSAPs from being able to communicate with mobile users and thereby preventing the emergency services personnel from providing the necessary assistance. Even when a limited number of users can reach PSAPs, PSAPs may not have the correct estimation of the people affected by the incident in a critical time interval. When there is enough bandwidth, depending on the incident severity, there may not be enough emergency personnel to respond individual calls.

Accordingly, there is a need for a method and apparatus to aggregate information to ensure reliable completion of emergency calls in a wireless communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to various embodiments, a wireless communication device in a wireless communication system aggregates information to ensure reliable completion of emergency calls. The wireless communication device receives a request for an emergency call from a mobile device associated with an end user. The wireless communication device estimates available bandwidth for the requested emergency call and when the available bandwidth is less than a predetermined threshold the wireless communication device commences information aggregation in accordance with embodiments of the invention. The wireless communication device aggregates information related to a plurality of emergency calls and sends a message to a plurality of wireless communication devices, wherein the message includes data about information aggregation. The wireless communication device also sends the aggregated information to a Public Safety Answering Point (PSAP). The wireless communication device receives a response message from the PSAP, wherein the response message comprises information related to emergency context. The wireless communication device than transmits an emergency message to the plurality wireless communication devices wherein the emergency message is one of the response message and a stored emergency message.

Figure 1:
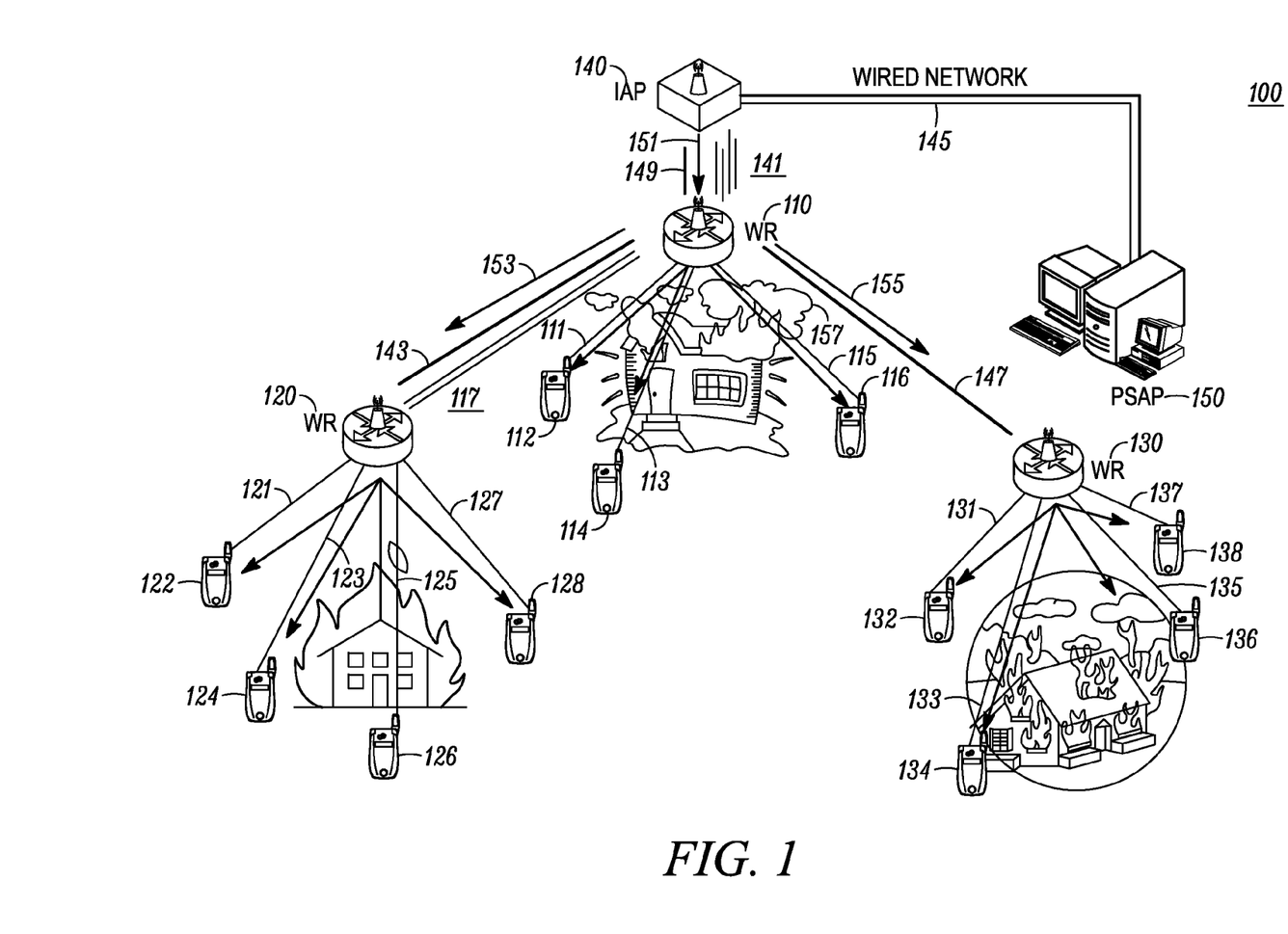
FIG. 1 is a block diagram of a wireless communication system which implements information aggregation is accordance with some embodiments.

Referring now to the drawings, and in particular FIG. 1, a wireless communication system 100 is illustrated. In accordance with some embodiments, nodes in the wireless communication system 100 implement a method to aggregate information to ensure reliable completion of emergency calls initiated by an end user in the wireless communication system 100. Those skilled in the art will recognize and appreciate that the specifics of this example are merely illustrative of some embodiments and that the teachings set forth herein are applicable in a variety of alternative settings. For example, in some embodiments, the nodes in the wireless communication system 100 operate in accordance with standards promulgated by Institute of Electrical and Electronics Engineers (IEEE) and Internet Engineering Task Force (IETF), such as IEEE drafts for 802.11(s) (mesh networks), 802.11u, 802.11(k), and 802.11(v) standards. (For this and any IEEE standards recited herein, see: http://standards.ieee.org/getieee802/index.html or contact the IEEE at IEEE, 445 Hoes Lane, PO Box 1331, Piscataway, N.J. 08855-1331, USA.) It will be appreciated by those of ordinary skill in the art that the teachings disclosed herein are not limited to any particular system implementation. As such, other alternate implementations using different communications systems operating on different protocols are contemplated and within the scope of the various teachings described herein. Generally, the teachings disclosed herein are applicable in any wireless communication system which can dynamically alter their topology and/or operational parameters to respond to the needs of a particular user while enforcing operating and regulatory policies and optimizing overall network performance. Cognitive networks are examples of such smart networks.

As shown in FIG. 1, the wireless communication system 100 comprises a plurality of nodes, here after Wireless Routers (WRs) 110, 120, and 130. Although, FIG. 1 illustrates three WRs 110, 120, and 130, those skilled in the art will appreciate that the embodiments of the invention can be implemented in any wireless communication system comprising any number of WRs. In accordance with one embodiment, a WR is a Mesh Wireless Router (MWR) which operates in accordance with IEEE 802.11(s) draft standard. In general, the term WR includes, but is not limited to, equipment/apparatus commonly referred to as Access Point (AP), Mesh Access Point (MAP), and the like. Each of the WR 110, 120, and 130 has at least a transceiver, a processing device, a memory unit, and an interface for communications with other WR and mobile devices in the wireless communication system 100.

The wireless communication system 100 further comprises a plurality of mobile devices 112, 114, 116, 122, 124, 126, 128, 132, 134, 136, and 138 each associated with an end user (not shown). As used herein, the term mobile device includes, but is not limited to, equipment commonly referred to as access devices, access terminals, user equipment, mobile stations, mobile subscriber units, and any other device capable of operating in a wireless environment. The mobile devices comprise at least transceiver apparatus (i.e., a transmitter and receiver), a processing device, and an interface for communication with an access point or another mobile device, wherein the interface may be a fixed-line interface or a wireless interface established using any suitable protocol. In accordance with one embodiment, each of the plurality of mobile devices 112, 114, 116, 122, 124, 126, 128, 132, 134, 136, and 138 operate in accordance with IEEE 802.11(s) draft standard.

As shown in FIG. 1, mobile devices 122, 124, 126, 128 are connected to WR 120. Similarly mobile devices 112, 114, and 116 are connected to WR 110 and mobile devices 132, 134, 136, and 138 are connected to WR 130. Each mobile device communicates with other mobile devices and/or fixed-line devices by establishing a link either directly to the destination device or alternatively via one or more WRs. The wireless communication system 100 further includes an Intelligent Access Point (IAP) 140 which connects one or more mobile devices to external wired networks and a Public Safety Answering Point (PSAP) 150, wherein the PSAP receives and responds to the emergency calls initiated by the end users associated with the mobile devices.

In accordance with some embodiments, an end user associated with mobile device 122 initiates an emergency call to report an emergency situation, such as an emergency situation caused by a fire. Typically, a large number of people are affected by a natural disaster such as forest fires, typhoons, floods, and the like. As shown in FIG. 1, end users associated with mobile devices 112, 114, 116, 122, 124, 126, 128, 132, 134, 136, and 138 are affected by widespread fire. The end users in an emergency situation initiate emergency calls to the dispatcher (i.e. PSAP 150) through the mobile devices 112, 114, 116, 122, 124, 126, 128, 132, 134, 136, and 138 to report the emergency situation and to seek assistance. For example, the mobile device 122 sends a request 121 to WR 120 to start an emergency call with the dispatcher (i.e. PSAP 150). The WR 120 forwards the request 117 to the next WR 110, which further forwards the request 141 to IAP 140 and ultimately the PSAP 150 receives the forwarded request for the emergency call initiated by mobile device 122 from the IAP 140 via a wired network 145. Depending upon the resource availability at the PSAP 150 the emergency call is completed and appropriate response is sent to the end user. Those skilled in the art will recognize and appreciate that other end users associated with mobile devices 112, 114, 116, 124, 126, 128, 132, 134, 136, and 138 can also initiate an emergency call and seek assistance from the nearest PSAP.

The wireless communication system 100 might fail to support a large number of emergency calls by using conventional routing methods. For example, there might be a bottleneck between WR 110 and IAP 140 because of limited bandwidth when a large number of emergency calls are initiated by end users. There may be cases where voice call requirements can not be met even voice packet or L2 datagram aggregation are used. To overcome such potential for failure, in accordance with some embodiments, WR 110 starts aggregating information regarding emergency calls based on their context as soon as it detects a bottleneck in the wireless communication system 100. The WR 110 also informs its precursor WRs, if any, about information aggregation. For example, WR 110 sends a message with a flag to WRs 120 and 130 which indicates emergency information aggregation at WR 110. In accordance with some embodiments, WRs 120 and 130 can also start aggregating emergency information locally after receiving the message with the flag from WR 110. For example, WR 130 can aggregate emergency information related to emergency calls 131, 133, and 135, and 137 initiated by mobile devices 132, 134, 136, and 138 respectively and forward the aggregated emergency information 147 to WR 110. Similarly, WR 120 can aggregate emergency information related to emergency calls 123, 125, and 127 initiated by mobile devices 124, 126, and 128 respectively and forward the aggregated emergency information 143 to WR 110. In this situation, WR 110 aggregates aggregated emergency information 143 and 147 with information from emergency calls 111, 113, and 115 initiated by mobile devices 112, 114, and 116 respectively. WR 110 also sends the aggregated emergency information 149 to the IAP 140 which forwards the aggregated emergency information to PSAP 150 via the wired network 145. Generally, PSAP 150 responds by providing emergency instructions based on emergency context. After receiving the response message from PSAP 150 via the IAP 140, WR 110 multicasts/broadcasts 153, 155, 157 the response message to WRs 120, 130 and mobile devices 112, 114, and 116. WRs 120 and 130 further multicast 127, 137 the response message to mobile devices 124, 126, 128, 132, 134, 136, and 138. In this way, end users associated with the mobile devices 112, 114, 116, 124, 126, 128, 132, 134, 136, and 138 receive the emergency instructions sent by PSAP 150.

In accordance with some embodiments, the information aggregation is automatically triggered at the wireless communication device when the number of emergency calls exceeds the multihop capacity to the egress point. The wireless communication device can use known capacity measurement methods to calculate the call handling capacity. For example, in a network which operates in accordance with 802.11 small call connection messages and information elements (e.g. Add Traffic Stream (ADDTS)/Traffic Specification (TSPEC)) will reach the Access Point (AP) even though the AP can not accept the data stream. In this situation, when the AP detects the blocked/dropped call, it informs the network of the dropped call. The bottleneck WR starts information aggregation and it also informs its precursor WRs, if any, of the information aggregation. The bottleneck WR can employ voice packet aggregation and layer 2 (L2) datagram concatenation techniques. The bottleneck WR sends the aggregated information to appropriate/nearest PSAP. The aggregated information provides high level semantics, e.g. number of emergency call setup requests from mobile devices in a region, user/caller identifications (ids), location information, emergency type, and the like. In accordance with an embodiment, the PSAP responds to the bottleneck WR by providing general information related to emergency. The general information typically includes emergency instructions based on emergency type. The bottleneck WR than multicasts/broadcasts the general information to mobile devices to inform them about the help provided by PSAP. This feature provides important information to end users who could not connect to PSAP. If the end user finds the broadcasted information sufficient, he/she may choose to follow the instructions and not to initiate a call. Furthermore, the information regarding the caller ids of the users who tried to initiate emergency calls, their location and other information will be sent in a file format to PSAP personnel who can initiate calls using a callback list for these users. This feature provides a better management of calls by avoiding the call explosion in the incident area from mobile nodes to portal.

Figures 2, 2A:
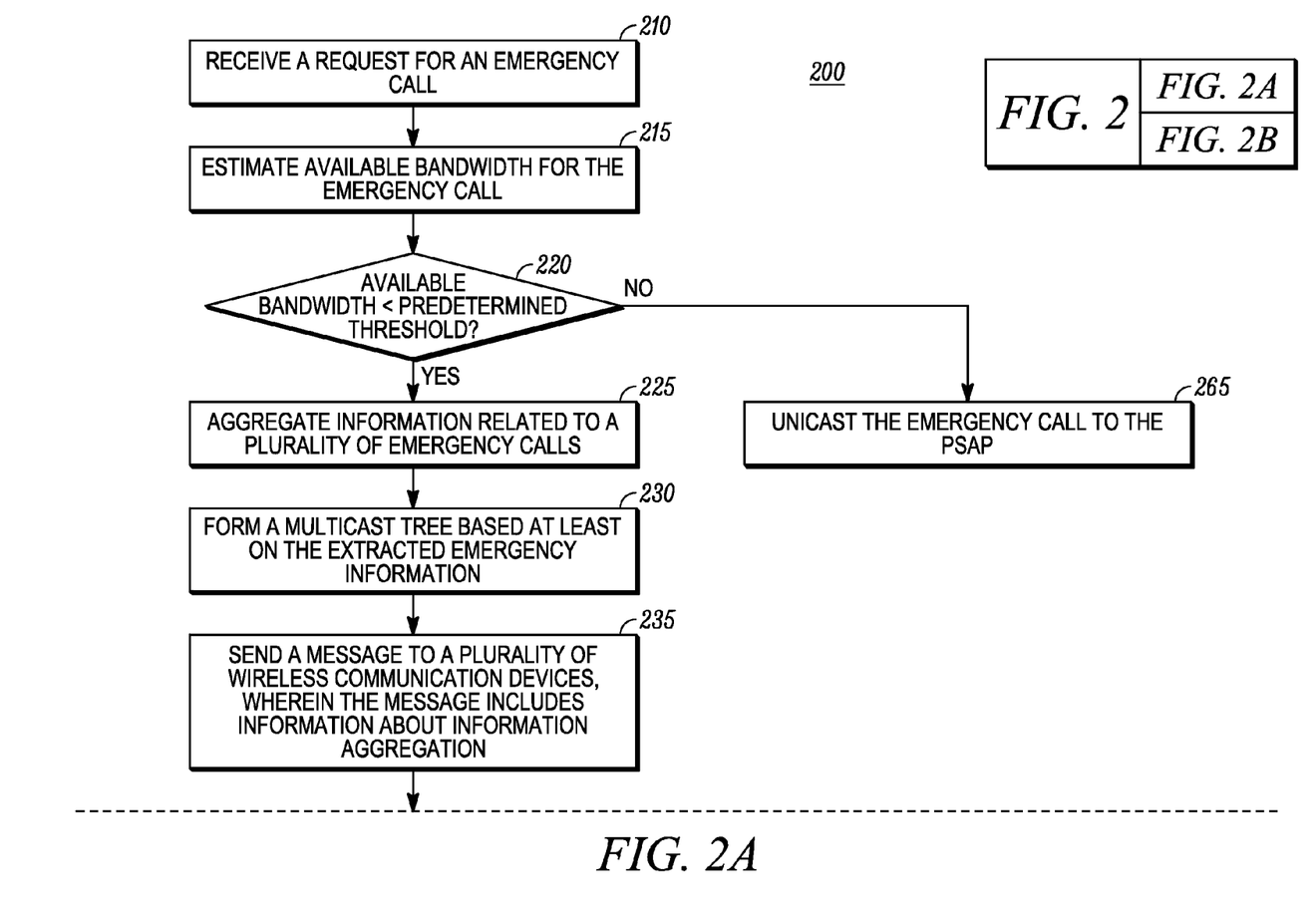
FIG. 2 is a flowchart of a method of aggregating information at a wireless communication device in accordance with some embodiments.
Figure 2B:
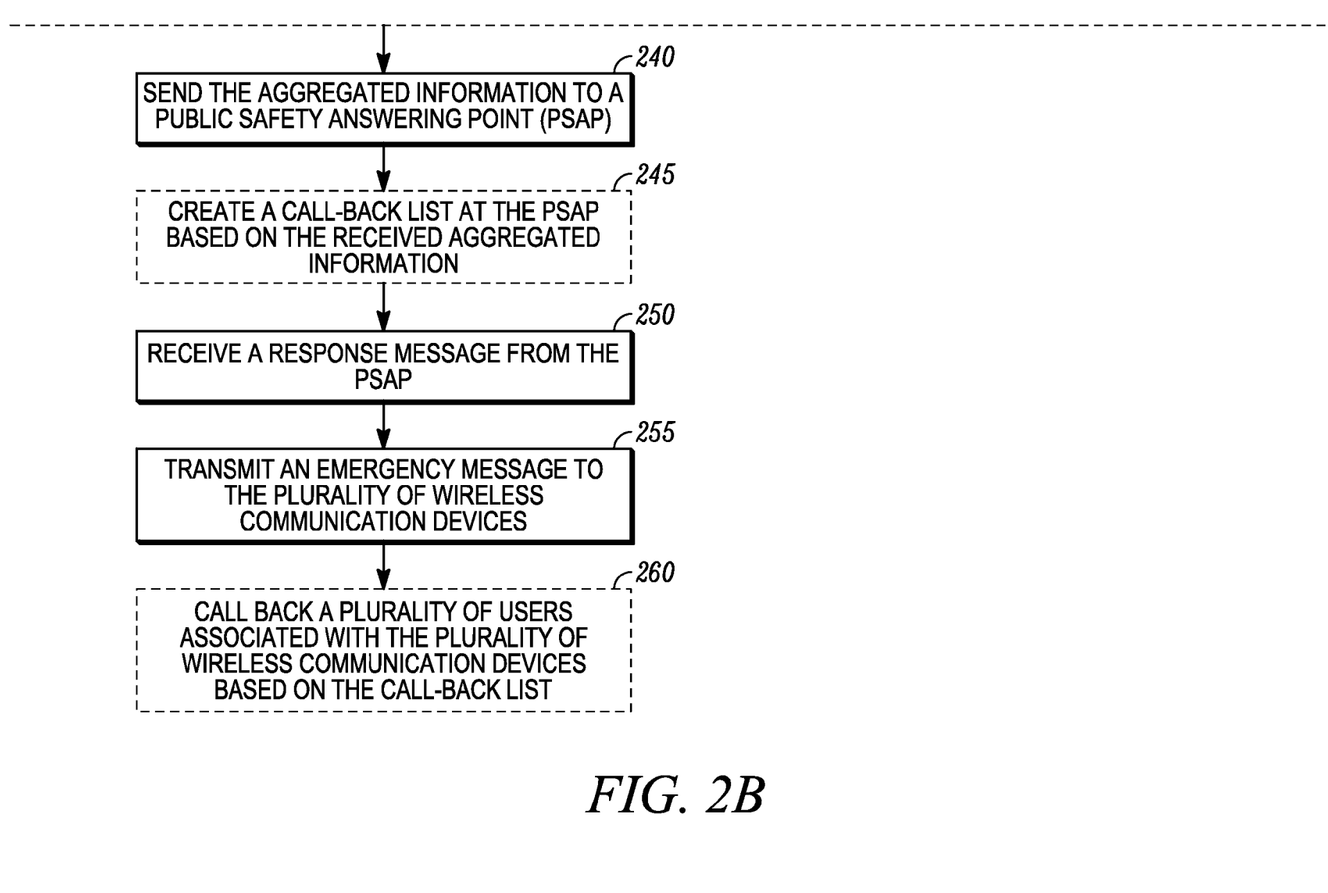

Referring now to FIG. 2, a flow diagram illustrating a method 200 of aggregating information at a wireless communication device in accordance with some embodiments is shown. In general, the method 200 can be implemented at any portal/gateway such as IAP 140 shown in FIG. 1. As described above, the bottleneck node can be any Mesh Wireless Router (MWR)/Mesh Point (MP)/Mesh Access Point (MAP) along the route including the portal/gateway. It will be appreciated that, as described herein, the terms wireless communication device, MAP, MWR, and MP are used interchangeably. Further, it will be appreciated by those of ordinary skill in the art that the method 200 illustrated by reference to FIG. 2 includes functionality that may be performed in hardware, firmware, software or a combination thereof and may further be performed at a single node or a combination of nodes in the wireless communication system 100. Also, one or more steps of the method 200 can be performed at supporting hardware units external to the nodes.

Illustrative details for implementing the method 200 will next be described. Generally mapping of high level emergency information to layer 2 data is provided as described above for 802.11 type networks. For example, the extra field for emergency calls is ADDTS/TSPEC messages can be used for this purpose. If the flow indicates this is an emergency call establishment request, the wireless communication device (i.e. IAP) can trigger the emergency call establishment procedure. At step 210, a wireless communication device, receives a request for an emergency call. The emergency call is initiated by an end user who is affected by an emergency such as fire. At step 215, the wireless communication device estimates available bandwidth for the emergency call. In accordance with one embodiment, the wireless communication device estimates available bandwidth for the emergency call by distributing the request for the emergency call to a plurality of wireless communication devices and receiving replies from the plurality of wireless communication devices, wherein a reply indicates a bandwidth margin left after routing the emergency call. In a Mesh network based on the call admission control scheme used, the multihop call capacity can be computed by distributing this request over multiple hops to the egress point and then receiving the replies. Each intermediate node updates its margin for the new request and forwards it along the path. In accordance with an alternate embodiment, the wireless communication device estimates available bandwidth for the emergency call by using capacity measurements stored in a knowledge database. Generally, usage of prior capacity measurements reduce connection delay is establishing an emergency call. Since the emergency calls have higher priority, normal voice calls can be preempted to accommodate new emergency calls and bandwidth estimations are done based on possible preemption options.

At step 220, the wireless communication device compares the available bandwidth with a predetermined threshold. If the available bandwidth exceeds a predetermined threshold the wireless communication device unicasts the emergency call to the PSAP (step 265). Typically, the call is routed to the next WR until the egress point and then to the appropriate/nearest PSAP. However, when the available bandwidth is less than the predetermined threshold the wireless communication device aggregates information related to a plurality of emergency calls at step 225.

Generally aggregation of emergency calls comprises voice frame aggregation and L2 datagram aggregation. If these methods can not solve the bandwidth problem, in accordance with some embodiments, information aggregation and context routing are applied by aggregating L2 emergency information to send high level semantics to the PSAP. For instance, an emergency module at the MAP can map this information when the aggregation is triggered. Another way would be to signal mobile stations to send L2 emergency context to the MAP. Different emergency call applications (voice activated emergency graphical user interfaces (GUIs), voice to text converters, query/reply type emergency services) can be applied if more detailed emergency context is desired (in addition to "emergency call request" and "user id/location"). Additional information is also useful to distinguish the number of victims of an emergency since multiple users can call for the same victim, such as multiple people calling for the same accident. The high level semantics can be as simple as the number of emergency call requests initiated in a BSS or as complex as the number of people injured by a fire in a determined location. In general, the information related to an emergency call (i.e. emergency information) includes at least one of:
a) location information,
b) caller identification information, and
c) emergency type information.

The MAP aggregates information related to a plurality of emergency calls by aggregating the above described emergency information.

Typically, the wireless communication device/MAP aggregates information based on the location from which the plurality of emergency calls originate, type of the emergency, and PSAP identification information, wherein the PSAP identification information indicates a PSAP which serves a geographical area. In general, The aggregation may be based on the following criteria:
a) mapping the first request location to the answering PSAP,
b) pre-configuration of PSAP IDs that serve a geographical area,
c) location aggregation without PSAP information, and
d) location and emergency type information.

At step 230, the wireless communication device forms a multicast tree based on emergency information extracted from the plurality of emergency calls. Creation of multicasts trees prevents flooding of announcements to the mobile devices in the wireless communication network. At step 235, the wireless communication device sends a message to a plurality of wireless communication devices, wherein the message includes information about information aggregation. For example, as described above IAP 140 sends a message with a flag to its precursor nodes (WRs 110, 120 and 130) informing them about information aggregation. At step 240, the wireless communication device sends the aggregated information to the PSAP. In accordance with one embodiment, the PSAP extracts emergency information from the aggregated information and forms a call-back list (step 245). Alternatively, once the admitted calls are finished, other aggregated calls can be established for the same area by initiating calls from the PSAP. This is achieved by creating a callback list at the bottleneck MAP that includes the callers that could not initiate emergency calls. The end product is a file sent to PSAP, including an emergency message with caller ids and location. The calls then may be initiated back from PSAP without creating call explosion at the same time. In some systems, an emergency call tandem can read the Automatic Number Identification (ANI) information and route the callback number to a digital display at the appropriate PSAP. Armed with this ANI information, the PSAP has equipment allowing it to request and receive the caller's physical address or Automatic Location Information (ALI) and call back the users. The emergency call tandems can also process different ALI information from mobile networks. These applications can be extended for the aggregated information described in this invention. Also, the PSAP personnel can then create a call-back list manually based on the received information.

At step 250, the wireless communication device receives a response message from the PSAP, wherein the response message comprises at least information related to the emergency context. At step 255, the wireless communication device transmits an emergency message to a plurality of wireless communication devices. The plurality of communication devices includes both mobile devices and other WRs in the wireless communication system. For example, WR 110 transmits response message from PSAP 150 to mobile devices 112, 114, and 116 and also to WRs 120 and 130. In accordance with one embodiment, the emergency message is the response message received from the PSAP. In alternate embodiment, the emergency message could be a stored emergency message which is selected based on the response message from PSAP. Generally, once the replies for call establishment (e.g. replies to ADDTS/TSPECS) are received, the wireless communication device will broadcast/multicast or send a single unicast message to every precursor node in accordance with the multicast tree. If proactive routes to the egress point are maintained, this multicast tree includes all the precursor nodes to the egress point, including the ones that did not receive any emergency call yet. Therefore, MAPs that are not congested yet may be aware of the path congestion beforehand and start aggregation. These MAPs can advertise the type of available emergency services (e.g. emergency voice call or emergency information aggregation support) in their capability announcement messages accordingly. If the final precursor node is a MAP, it will send a unicast reply to the corresponding user or broadcast emergency messages. These multicast/broadcast messages include announcement of emergency situation, change in emergency call process, emergency instructions sent by PSAP or stored in the MAP for different incident types etc. It would be appreciated by those skilled in the art that the multicast tree is formed at the aggregation MP based on the incident location. At step 260, the PSAP can call back a plurality of users associated with a plurality of wireless communication devices based on the call back list.

Figure 3A:
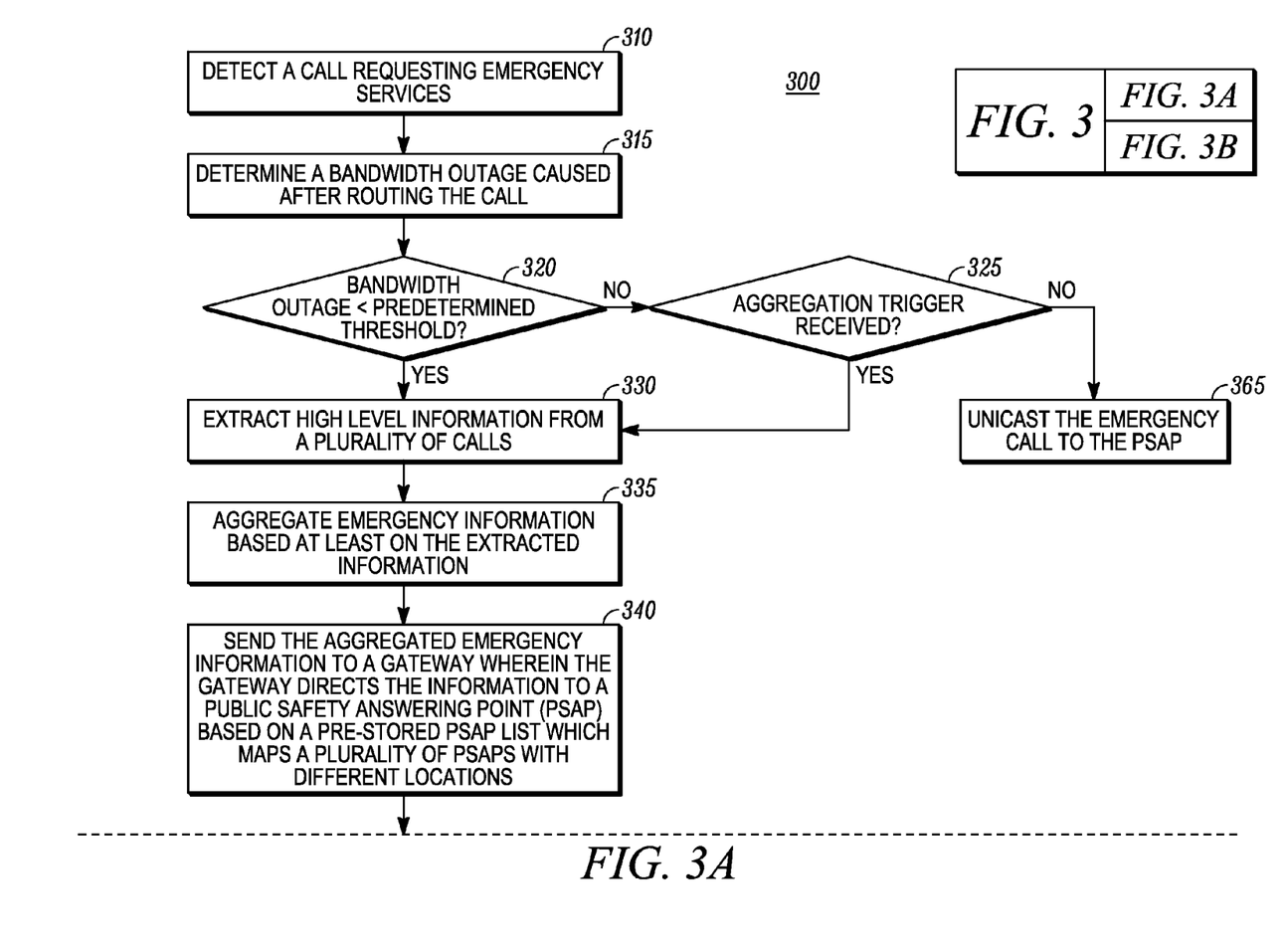
FIG. 3 is a flowchart of a method of aggregating information at a wireless communication device in accordance with alternate embodiments.
Figure 3B:
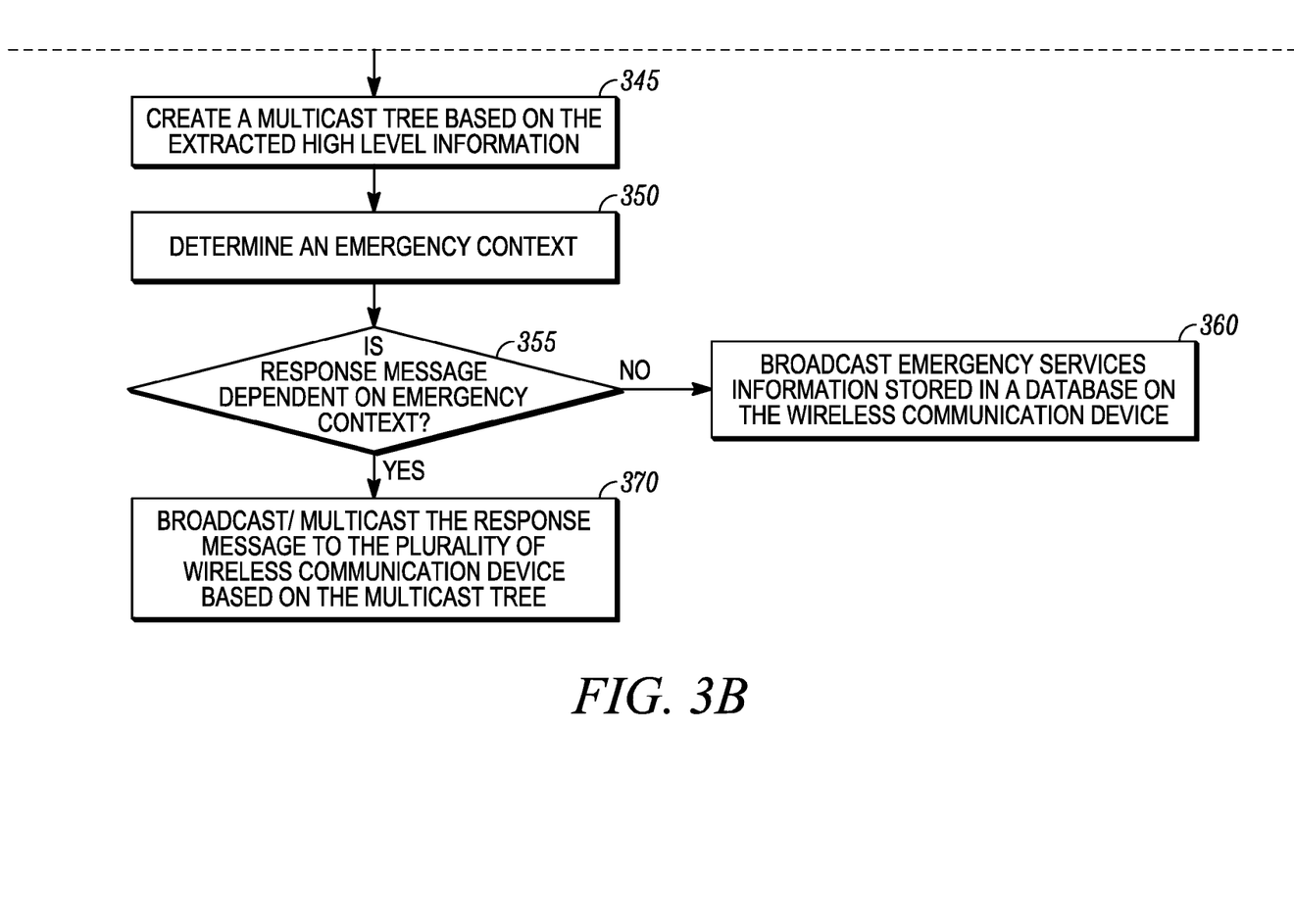

Referring now to FIG. 3, a flow diagram illustrating a method 300 of aggregating information at a wireless communication device in accordance with alternate embodiments is shown. The method 300 can be implemented at WRs 110, 120, and 130 in the wireless communication system 100 shown in FIG. 1. In general, the method 300 can be implemented at any node in the wireless communication system. As described above, the bottleneck node can be any Mesh Wireless Router (MWR)/Mesh Point (MP)/Mesh Access Point (MAP) along the route including the portal/gateway. Further, it will be appreciated by those of ordinary skill in the art that the method 300 illustrated by reference to FIG. 3 includes functionality that may be performed in hardware, firmware, software or a combination thereof and may further be performed at a single node or a combination of nodes in the wireless communication system 100. Also, one or more steps of the method 300 can be performed at supporting hardware units external to the nodes.

Illustrative details for implementing the method 300 will next be described. At step 310, a wireless communication device detects a call requesting emergency services. At step 315, the bandwidth outage caused by routing the emergency call is determined. In one embodiment, determining bandwidth outage comprises distributing the call to a plurality of wireless communication and receiving replies from the plurality of wireless communication devices, wherein a reply indicates a bandwidth margin left after routing the call. Generally, the bandwidth outrage is determined by not actually routing the call but routing a request for the emergency call through intermediate WRs wherein each WR subtracts the needed bandwidth from available bandwidth and passes on the request to the next WR. In an alternate embodiment, the wireless communication device determines bandwidth outage by using capacity measurements stored in a knowledge database.

At step 320, the wireless communication device compares the bandwidth outage with a predetermined threshold. When the bandwidth outage exceeds the predetermined threshold the wireless communication device checks (at step 325) whether or not it has received an aggregation trigger from another WR. When there is no received aggregation trigger the wireless communication device unicasts the emergency call to the PSAP (step 365). However, when the bandwidth outage is less than the predetermined threshold or an aggregation trigger is received by the wireless communication device, the wireless device starts extracting (step 330) high level information from a plurality of emergency calls. For example, the wireless communication device/MAP can receive an aggregation trigger in the form of a message having a flag from another MAP. As described above with reference to FIG. 1, when MAPs and intermediate MPs/MAPs aggregate the emergency calls, an extra flag can be added into the information metadata to let the application at the PSAP know that this is a multiple call situation. Also, the aggregated information packets can be set to emergency priority. The MAP in the first hop can send the number of requests aggregated/blocked. Based on one or more emergency applications implemented within the network, a broadcast/multicast message can be generated at the MAP to be sent to the emergency callers whose requests are not sent individually to let the users know that emergency parties are informed about the incident.

At step 335, the MAP aggregates emergency information based at least on the extracted high level information. The extracted high level information includes, but is not limited to location information, caller identification information, and emergency type information. As described in detail above, the aggregated information typically comprises aggregated high level information and aggregated call signaling information. At step 340, the aggregated emergency information is sent to a gateway wherein the gateway directs the aggregated information to PSAP based on pre-stored PSAP list which maps a plurality of PSAPs with different locations. The gateway ensures that the aggregated emergency information for emergency calls originating from a particular location is routed to the nearest PSAP.

At step 345, a multicast tree is created based on the extracted high level information. A multicast tree at egress points/gateways or PSAP is formed to reduce the bandwidth consumption, on aggregated emergency information that includes stations ids. The front end MAP can then multicast or broadcast this information to the stations. This would help reduce congestion since applying conventional call admission to reject some calls would not reduce the request packets to connect to BSS as users would retry connecting to the network. At step 350, the PSAP determines an emergency context based on the aggregated high level information. Based on the emergency context the PSAP sends a response message to the gateway which forwards the response message to appropriate MAPs. Generally, the MAP also determines the emergency context by processing the high level information. The MAP also processes the received response message and at step 355, the MAP determines whether or not the response message is dependent on the emergency context. When the received response message is related to emergency context the MAP multicasts/broadcasts the response message to a plurality of communication devices (both mobile devices and WRs) (step 370) otherwise the MAP broadcasts stored emergency services information to the plurality of communication devices (both mobile devices and WRs) (step 360). Those skilled in the art will recognize and appreciate that the MAP can also bypass step 355. In this case, the MAP broadcasts/multicasts the response message from PSAP and stored emergency services information to the plurality of communication devices (both mobile devices and WRs).

Figure 4:
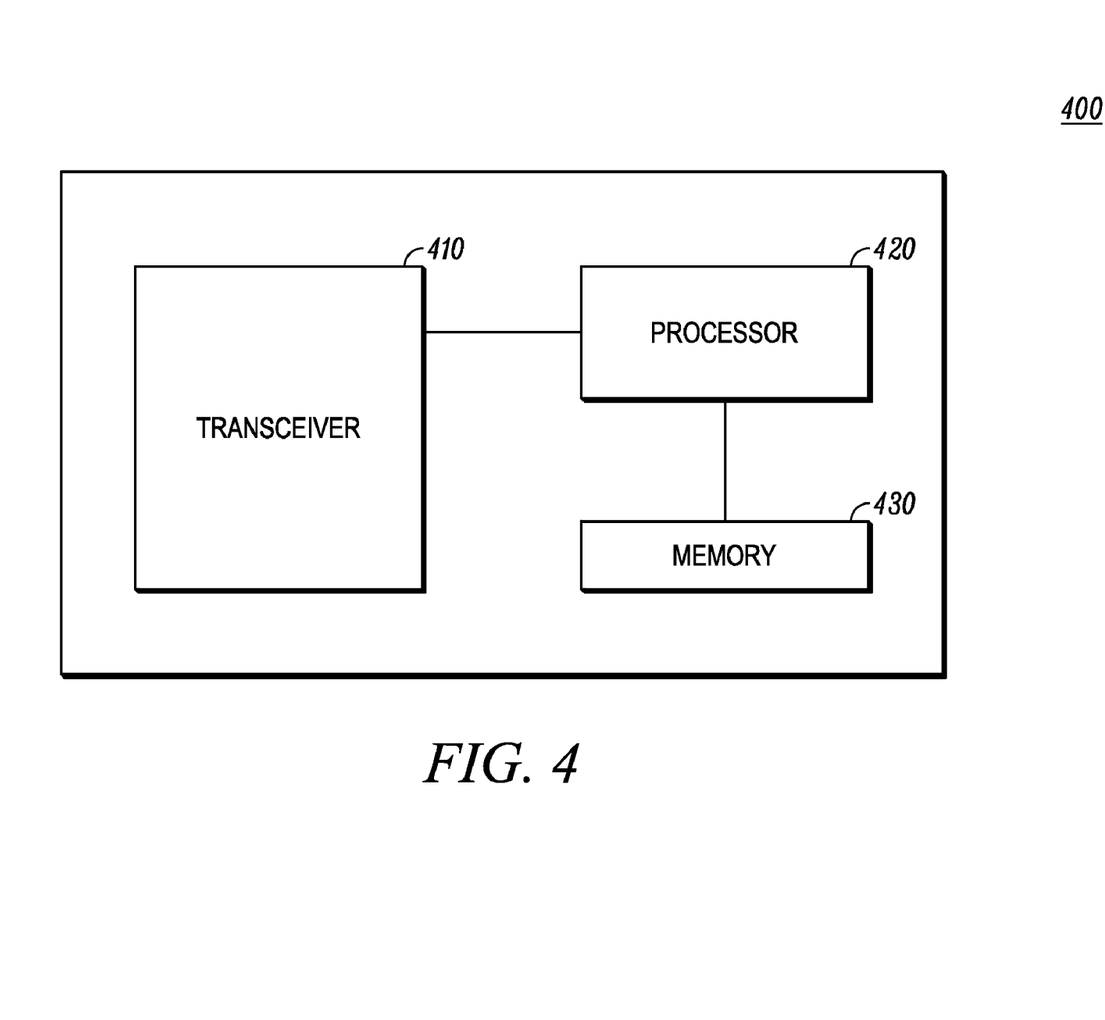
FIG. 4 is a block diagram illustrating an apparatus to aggregate information in a wireless communication system.

FIG. 4 is a block diagram illustrating an apparatus 400 to aggregate information in the wireless communication system in accordance with some embodiments. The apparatus 400 implements the methods 200 and 300 described in FIGS. 2 and 3 in accordance with various embodiments of the present invention. The apparatus 400 can be any type of wireless communication device including, but not limited to, WR, AP, MAP, MWR, MP, and the like. Apparatus 400 also illustrates functional blocks of the nodes 110, 120, and 130 of wireless communication system 100 as shown in FIG. 1 in accordance with some embodiments.

The apparatus 400, for example, can be an integrated unit containing at least all the elements depicted in FIG. 4, as well as any other elements necessary for the apparatus 400 to perform its particular functions. Alternatively, the apparatus 400 can comprise a collection of appropriately interconnected units or devices, wherein such units or devices perform functions that are equivalent to the functions performed by the elements of the apparatus 400.

As shown in FIG. 4, apparatus 400 comprises a transceiver 410, a processor 420, and a memory 430. The transceiver 410 transmits/receives signals via an antenna (not shown). The transceiver 410 employs conventional modulation and demodulation techniques for transmitting and receiving communication signals, such as packetized signals, to and from the apparatus 400 under the control of the processor 420. The packetized data signals can include, for example, voice, data or multimedia information, and packetized control signals, including node update information. The transceiver 410 is coupled to a processor 420. The processor 420 is configured to receive a request for an emergency call from a mobile device or another WR and to estimate available bandwidth for the emergency call. The processor 420 is further configured to compare the available bandwidth with a predetermined threshold and when the available bandwidth is less than a predetermined threshold the processor 420 aggregates information related to a plurality of emergency calls, sends a message to a plurality of wireless communication devices, wherein the message includes information about information aggregation, sending the aggregated information to a Public Safety Answering Point (PSAP), receives a response message from the PSAP, and transmits the response message to the plurality of wireless communication devices (both mobile devices and WRs). The apparatus 400 also includes a memory element 430 coupled to the processor 420 which can store emergency context information, emergency services information, and bandwidth capacity measurements.

In accordance with some embodiments the apparatus 400 is configured to operate over an ad hoc networking air interface (e.g., Bluetooth, 802.11 networking, 802.16 or 802.16e WiMAX (Worldwide Interoperability for Microwave Access), and the like).

Applications

Aggregating emergency information in accordance with embodiments of the invention not only increases the emergency call handling capacity of the system but it also helps in solving some security problems. For example, new emergency call regulations require users who are not subscribed to the network services to be able to connect to the network for emergency calls. This imposes new security challenges. One such challenge involves malicious users creating a high number of emergency calls to crash the system. Since a high number of emergency calls are aggregated allowing PSAP to initiate calls, the network resources would be preserved while allowing PSAP to query the user ID.

Information aggregation also helps PSAP personnel handle a large call volume. Instead of having individual calls, the emergency personnel can process high-level semantics that are automatically generated and estimate the amount of help needed, send appropriate instructions to users, inform other required parties, ensure users that help to their area is on the way, be able to serve more people, reduce panics and take appropriate actions such as initiating SMS based queries that are more delay tolerant as opposed to conventional voice calls that require low delay low-jitter communications for an understandable conversation or call back the users with better managed calls from gateways to mobile nodes.

Also, some Mobile Emergency Services regulations require callback after an emergency call has dropped. Another feature is to deliver an emergency warning message or call to one or more mobile phones. The present invention provides a system that can provide these features even when the call connection is not established at the emergency call tandem or PSAP by coordinating Basic Service Set Access Point (BSS AP) and IAP/Gateway functionalities in a mesh network.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of aggregating information at a wireless communication device in a wireless communication system, the method comprising:
   receiving a request for an emergency call;
   estimating available bandwidth for the emergency call; and
   when the estimated available bandwidth is less than a predetermined threshold or the wireless communication device has received an aggregation trigger:
      extracting high level information from a plurality of emergency calls,
      creating a multicast tree based on the extracted high level information,
      aggregating emergency information based at least on the extracted information,
      sending the aggregated emergency information to a gateway wherein the gateway directs the information to a Public Safety Answering Point (PSAP) based on a pre-stored PSAP list which maps a plurality of PSAPs with different locations,
      receiving a response message from the PSAP in response to the sent aggregated information, wherein the response message comprises at least information related to an emergency context, and
transmitting an emergency message to the plurality of wireless communication devices based on the multicast tree, wherein the emergency message is one of the response message and a stored emergency message.

2. The method of claim 1, wherein estimating available bandwidth for the emergency call comprises:
distributing the request for the emergency call to the plurality of wireless communication devices; and
receiving replies of the request from the plurality of wireless communication device, wherein a reply indicates a bandwidth margin left after routing the emergency call.

3. The method of claim 1, wherein estimating available bandwidth for the emergency call comprises using capacity measurement stored in a knowledge database.

4. The method of claim 1, wherein the aggregated information further comprises emergency information, wherein the emergency information includes at least one of:
location information,
caller identification information, and
and emergency type information.

5. The method of claim 4 further comprising:
extracting the emergency information from the plurality of emergency calls;
forming a multicast tree based at least on the extracted emergency information.

6. The method of claim 1, wherein aggregating information related to plurality of calls comprises at least one of:
aggregating a plurality of voice frames; and
aggregating the emergency information.

7. The method of claim 1, wherein the wireless communication device aggregates information based on at least one of:
a location from which the plurality of emergency calls originate,
a type of emergency, and
PSAP identification information, wherein the PSAP identification information indicates a PSAP which serves a geographical area.

8. The method of claim 1, wherein transmitting the emergency message to the plurality of wireless communication devices comprises multicasting/broadcasting the emergency message.

9. The method of claim 1 further comprising:
creating a call-back list at the PSAP based on the received aggregated information; and
calling back a plurality of users associated with the plurality of wireless communication devices based on the call-back list.

10. The method of claim 1 further comprising:
determining a bandwidth outage caused by routing the emergency call; and
performing the extracting, creating, aggregating, and sending operations when the bandwidth outage is less than a predetermined threshold.

11. The method of claim 10, wherein determining the bandwidth outage comprises:
distributing the call to a plurality of wireless communication devices; and
receiving replies from the plurality of wireless communication devices, wherein a reply indicates a bandwidth margin left after routing the emergency call.

12. The method of claim 10, wherein determining the bandwidth outage comprises using capacity measurement stored in a knowledge database.

13. The method of claim 10, wherein the high level information comprises
location information,
caller identification information, and
emergency type information.

14. The method of claim 10, wherein the aggregated information comprises at least one of:
aggregated high level information; and
aggregated voice packet information, wherein the aggregated voice packet information is generated by aggregating a plurality of voice packets.

15. The method of claim 10, wherein the aggregated information further comprises a flag, wherein the flag enables the PSAP to determine multiple emergency call situations.

16. The method of claim 10 further comprising:
determining an emergency context;
receiving a response message in response to the sent aggregated information from the PSAP through the gateway;
processing the response message; and
when the response message is dependent on the emergency context:
broadcasting/multicasting the response message to the plurality of wireless communication device based on the multicast tree,
otherwise, broadcasting emergency services information stored in a knowledge database on the wireless communication device.

17. The method of claim 16, wherein the emergency context is determined based on the high level information.

18. An apparatus for aggregating information in a wireless communication system, the apparatus comprising:
a transceiver; and
a processor configured to perform the operations of:
receiving a request for an emergency call;
estimating available bandwidth for the emergency call; and
when the estimated available bandwidth is less than a predetermined threshold or the wireless communication device has received an aggregation trigger:
extracting high level information from a plurality of emergency calls,
creating a multicast tree based on the extracted high level information,
aggregating emergency information based at least on the extracted information,
sending the aggregated emergency information to a gateway wherein the gateway directs the information to a Public Safety Answering Point (PSAP) based on a pre-stored PSAP list which maps a plurality of PSAPs with different locations,
receiving a response message in response to the sent aggregated information from the PSAP, wherein the response message comprises at least information related to an emergency context and
transmitting an emergency message to the plurality of wireless communication devices based on the multicast tree, wherein the emergency message is one of the response message and a stored emergency message.

19. The apparatus of claim 18, further comprising a memory element to perform the of storing emergency context information, emergency services information, and bandwidth capacity measurements.

* * * * *

UNITED STATES PATENT AND TRADEMARK OFFICE
CERTIFICATE OF CORRECTION

PATENT NO. : 8,160,537 B2  
APPLICATION NO. : 12/183697  
DATED : April 17, 2012  
INVENTOR(S) : Ozer et al.

Page 1 of 1

It is certified that error appears in the above-identified patent and that said Letters Patent is hereby corrected as shown below:

On the Face Page, in Field (56), under "OTHER PUBLICATIONS", in Column 2, Line 2, delete "802.11.05/0014r1," and insert -- 802.11-05/0014r1, --, therefor.

In Column 14, Line 54, in Claim 18, delete "context" and insert -- context, --, therefor.

In Column 14, Line 61, in Claim 19, delete "the of" and insert -- the operation of --, therefor.

Signed and Sealed this
First Day of January, 2013

David J. Kappos
*Director of the United States Patent and Trademark Office*